United States Patent
Meiners et al.

(10) Patent No.: US 9,671,061 B2
(45) Date of Patent: Jun. 6, 2017

(54) ANTI-SPIN MOUNTING POLE AND METHOD OF FORMING

(71) Applicants: Mark J. Meiners, Chesterfield, MO (US); Carl J. Meiners, Ballwin, MO (US); Robert S. Meiners, Chesterfield, MO (US)

(72) Inventors: Mark J. Meiners, Chesterfield, MO (US); Carl J. Meiners, Ballwin, MO (US); Robert S. Meiners, Chesterfield, MO (US)

(73) Assignee: Tubular U.S.A., Inc., Weldon Spring, MO (US)

( * ) Notice: Subject to any disclaimer, the term of this patent is extended or adjusted under 35 U.S.C. 154(b) by 0 days.

(21) Appl. No.: 14/121,085

(22) Filed: Jul. 29, 2014

(65) Prior Publication Data
US 2014/0346309 A1    Nov. 27, 2014

Related U.S. Application Data

(60) Continuation of application No. 13/694,248, filed on Nov. 14, 2012, now abandoned, which is a continuation-in-part of application No. 29/421,562, filed on Aug. 16, 2012, now Pat. No. Des. 690,290, which is a division of application No. 29/370,338, filed on Jul. 2, 2010, now Pat. No. Des. 673,536.

(51) Int. Cl.
*H01Q 1/12* (2006.01)
*F16M 13/02* (2006.01)
*B21D 51/16* (2006.01)

(52) U.S. Cl.
CPC ............. *F16M 13/02* (2013.01); *B21D 51/16* (2013.01); *H01Q 1/1242* (2013.01)

(58) Field of Classification Search
CPC ....... F16M 13/02; B21D 51/16; H01Q 1/1242
USPC ......... 248/523, 545, 679, 511, 519, 530, 87, 248/156; 72/370.23, 370.24, 370.26; 52/831, 851, 852, 855, 295, 296
See application file for complete search history.

(56) References Cited

U.S. PATENT DOCUMENTS

| | | | | |
|---|---|---|---|---|
| 19,763 | A | | 6/1886 | Pfeifer |
| 650,575 | A | | 5/1900 | Whitney |
| 832,583 | A | * | 10/1906 | Babiczky .................. E04C 3/32 52/851 |
| 832,711 | A | * | 10/1906 | Weber ....................... E04C 3/07 52/855 |

(Continued)

FOREIGN PATENT DOCUMENTS

EP        0014474        2/1980

*Primary Examiner* — Muhammad Ijaz
(74) *Attorney, Agent, or Firm* — Paul M. Denk

(57) ABSTRACT

An anti-spin mounting pole for holding a communications device mounted thereon generally stable relative to a desired position when the lower end portion of the resultant pole is installed in a concrete base, such anti-spin mounting pole formed from an elongated pole having a generally uniform cross-sectional configuration defining a nominal outer perimeter and having one or more compressed areas formed along the lower end portion of the pole to alter thereat the initial generally uniform cross-sectional configuration and effect an enhanced out-of-round condition defining an anti-spin portion that includes a pair of oppositely directed ears extending outwardly beyond the nominal outer perimeter of the elongated pole.

19 Claims, 5 Drawing Sheets

(56) References Cited

U.S. PATENT DOCUMENTS

| | | | |
|---|---|---|---|
| 963,030 A * | 7/1910 | Balch | A47J 37/0763 126/30 |
| 1,460,090 A * | 6/1923 | Baehr | E04C 5/03 52/831 |
| 1,604,437 A * | 10/1926 | White | E01C 11/08 404/68 |
| 1,689,504 A * | 10/1928 | Sheedy | E04C 5/03 52/852 |
| 3,066,769 A * | 12/1962 | Pasquale | E04H 12/2215 248/156 |
| 3,200,554 A | 8/1965 | Goodman et al. | |
| 3,285,554 A * | 11/1966 | Voelkerding | E01F 9/685 211/196 |
| 3,335,988 A * | 8/1967 | Herrick | A47J 37/0786 248/121 |
| 3,508,587 A * | 4/1970 | Mauch | 138/119 |
| 3,680,189 A * | 8/1972 | Noren | B21D 53/02 165/104.26 |
| 3,731,517 A * | 5/1973 | Johnson | B05B 1/04 29/890.08 |
| D234,596 S | 3/1975 | Sixt | |
| 3,967,489 A * | 7/1976 | Pohl | B21C 37/15 29/890.035 |
| 4,005,657 A | 2/1977 | Rothman | |
| 4,079,908 A * | 3/1978 | Davis | A45F 3/44 248/156 |
| 4,407,089 A * | 10/1983 | Miller | A01K 97/10 43/21.2 |
| 4,667,517 A * | 5/1987 | Holden | G01L 7/041 72/370.23 |
| D308,802 S * | 6/1990 | Ward | 248/156 |
| 4,949,862 A | 8/1990 | Barbarits et al. | |
| 5,330,075 A | 7/1994 | Brown, Sr. | |
| 5,526,670 A * | 6/1996 | Parola | B21D 41/00 72/370.1 |
| 6,257,041 B1 * | 7/2001 | Duggan | B21K 1/063 29/888.09 |
| 6,349,521 B1 * | 2/2002 | McKeon | B60R 19/18 293/102 |
| 6,523,302 B2 * | 2/2003 | Zayeratabat | A01G 17/14 248/530 |
| 6,922,942 B2 * | 8/2005 | Stefanutti | A01G 17/14 248/530 |
| D525,684 S | 7/2006 | Jhang | |
| 7,165,535 B2 | 1/2007 | Braun et al. | |
| 7,412,866 B2 * | 8/2008 | Jahani | B21C 25/08 301/124.1 |
| D583,486 S | 12/2008 | Kelley | |
| 7,955,147 B1 | 6/2011 | Legrady et al. | |
| D661,379 S | 6/2012 | Motegi et al. | |
| D661,382 S | 6/2012 | Motegi et al. | |
| D668,323 S | 10/2012 | Motegi et al. | |
| D673,536 S | 1/2013 | Meiners et al. | |
| D690,290 S | 9/2013 | Meiners et al. | |
| 2006/0147313 A1 | 7/2006 | Zengerle et al. | |
| 2011/0030834 A1 | 2/2011 | Booth | |
| 2012/0192613 A1 * | 8/2012 | Sakae | B21C 23/085 72/370.26 |
| 2013/0153738 A1 * | 6/2013 | Meiners | F16M 13/02 248/523 |
| 2013/0340365 A1 * | 12/2013 | Fromson | 52/223.6 |

* cited by examiner

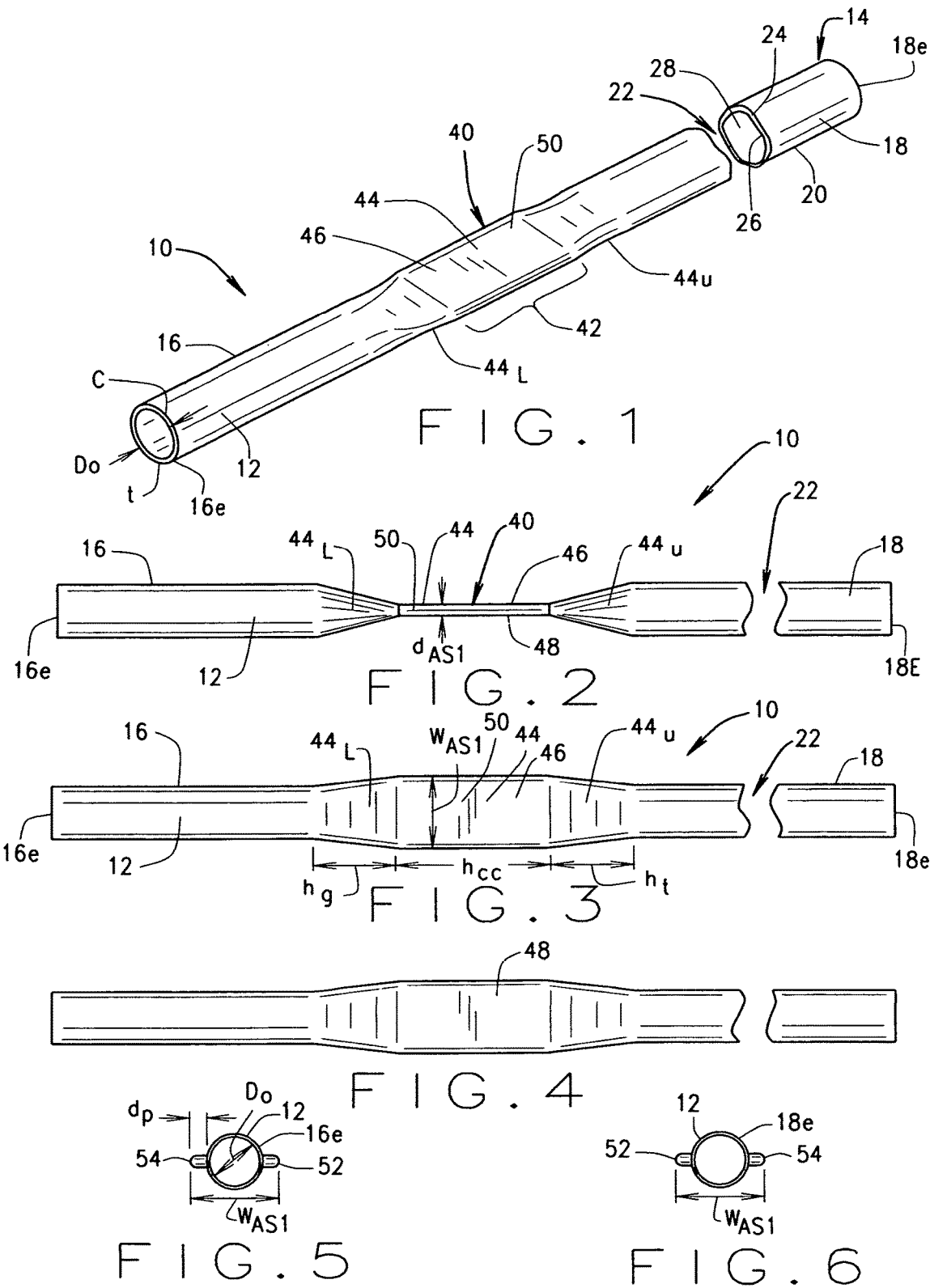

ANTI-SPIN MOUNTING POLE AND METHOD OF FORMING

CROSS REFERENCE TO RELATED APPLICATION

This continuation patent application claims priority to the continuation-in-part patent application having Ser. No. 13/694,248, filed on Nov. 14, 2012, which claims priority to the divisional design patent application having Ser. No. 29/421,562, filed on Aug. 16, 2012, which claims priority to the design patent application having Ser. No. 29/370,338, filed on Jul. 2, 2010.

FIELD OF THE INVENTION

This application relates to mounting poles for satellite dishes and like devices, and more particularly to poles intended for generally vertical installations thereof into base areas, with a satellite antenna or dish or like device installed thereon for the reception and/or transmission of electronic signals, and particularly to mounting poles resistant to spin or rotation when installed and anchored in such base areas.

BACKGROUND OF THE INVENTION

Over the years, the placement and positioning of antennae and dishes to receive electronic signals from signal or relay sources has come to be recognized as an important element in communications reception systems. The employment of antennae and dishes by individuals has become increasingly common with the advent of services that provide TV and other electronic signals via not only transmission towers and related structures but also via satellite.

As individuals and smaller businesses, in addition to governmental organizations and larger corporate organizations and communications entities, have increasingly engaged and contracted with various communications providers for the provision and/or interactive exchange of communications signals, the placement and appearance of antennae and dishes at or near homes and businesses has become an increasingly common sight. Depending upon geographic and environmental conditions, different provisions have had to be made for the placement and positioning of the antennae, dishes, and/or transmitters required to be utilized for the reception and/or transmission of signals, with accurate and clear lines of sight typically being required for access to or with a signal source or relay, including one or more satellites passing overhead.

It has been found convenient in the reception of electronic signals and transmissions to be able to mount the antennae and dishes intended to receive such signals and transmissions upon tubular poles that typically are installed extending generally vertically above a base surface in which a base portion of the pole is installed and anchored. Such tubular poles, which are most often of cylindrical cross-section, are generally relatively economical in cost, yet are strong enough, while remaining relatively lightweight, so as to be able to readily accommodate and support the installation upon the pole at or near the upper portion thereof of the requisite antennae and dishes for communications systems such as satellite and TV communications systems, especially when the antennae and dishes cannot be conveniently directly mounted upon a house or other structure and may need to be positioned at a distanced location for clear access positioning.

In the installation and use of such a pole, a hole three feet deep or so is often formed in the ground to receive such a pole, the bottom end portion of such pole is then positioned within the hole, with the upper portion of pole projecting generally vertically upward from the base surface, and the hole is filled so as to maintain the pole in an upright, typically generally vertical, position. Often, concrete or a like material is poured or installed around the erect pole to provide a more solid base in which the pole will remain locked. The resulting concrete slab or footing is intended to and often serves to better lock the base portion of the pole in place within the hole.

Once the pole has been so installed within a base area, an antenna, dish, or other device may be conveniently mounted upon the installed pole for use. However, the antennae and dishes so mounted upon installed mounting poles must be so mounted, either in a fixed alignment position or a base reference position on the pole, to properly align the antennae and dishes to receive the desired signals. In some instances, a mounted dish may be designed to be movable, such as by a positioning control and/or motor, to be able to properly align and realign the dish to be able to access signals from different sources, such as different satellites, but relatively precise alignment for a given source is generally nevertheless required regardless of the source, whether the alignment is set independently for a given source or is based upon a base reference alignment.

A number of communications services and providers, including services such as Dish, DirecTV, Wild Blue, and Hughes Net, to name but a few, presently offer TV and other communications services to subscribers, and offer and/or require the use of particular equipment and devices for the reception and/or transmission of signals specific to their service. Many provide and utilize cylindrically tubular mounting poles for the placement of requisite antennae and dishes, with such mounting poles designed to have specific characteristics, such as specific outer diameters.

Many of such mounting poles, despite differing outer diameters, have come to have somewhat standardized lengths, typically approximately 72 inches long or longer, and are intended to have a lower end thereof installably mounted in a concrete or like base. Some of such mounting poles, especially those intended for use in northern climates, are of even longer lengths, such as approximately 96 inches long, so that the lower end of the pole can readily extend to below the frost line.

Although no standardization of dimensions for mounting poles exists, many users and suppliers have found it convenient to utilize various gauges and diameters. Gauges such as 9, 14, 16, and 18 have been used. But not limited to these gauges. Diameters include 1.660", 2.000", 2.375", but not limited to these.

Such mounting poles are generally intended to be erected to project generally vertically upwardly from the base areas in which they are anchored and to be positioned at geographic locations where antennae and dishes can be mounted on them so as to be alignable in a clear line of sight with the signal source or relay from which the communications signal will be available.

Depending upon the service provider and the signals to be received, alignment with one or more different signal sources or relays may be necessary or desired. In any event, accurate alignment is an important factor for the reception of the desired signals.

Even with the pole inserted in a concrete slab or footing to try to lock it in position, such a pole, because of its generally round or circular cross section, is subject to spin or rotation, especially over time. Such spinning or rotation may be caused by freezing and thawing of the earth. Another cause may be wind, or other weather related factors. Generally, the occurrence of even a small amount of spin or rotation may be sufficient to affect the positioning of the antennae or dishes relative to precision alignment required for the accurate reception of signals by such antennae or dishes. In such an event, the reception may become degraded, if not totally disrupted, and a service call and a visit by a technician to realign the antennae and dishes will often become necessary, with resultant inconvenience, often involving loss of signal for some time, and expense.

To try to address and maintain proper alignment of antennae and dishes, a variety of mounting systems have been advanced, some of which include the mounting of the antennae upon structures other than poles so as to try to eliminate or obviate pole rotation factors while others of which, including for reasons of cost and simplicity, continue to employ tubular poles but attempt to minimize rotation thereof by employing accompanying bracing devices or stays or guides or like constructions therewith.

In some instances, stays and guy wires have been attached to the erected poles to try to minimize rotation. Such approaches, however, are typically site specific, and therefore generally labor intensive.

In other instances, in attempts toward greater standardization and towards cost minimization, anchoring fins have been welded to the tubular poles near to bottom ends of the poles prior to the placement of the bottom ends into concrete bases in the hope that such welded fins would hold the poles in place against rotation. In still other instances, instead of using welded fins, laterally extending holes have been drilled through the walls of the tubular poles near to their bottoms end and rebar has been inserted through the holes to project laterally beyond the outer diameters of the poles. The rebar projections were intended to help lock the poles in position in the concrete base to prevent rotation of the pole. Such approaches at standardization, while somewhat effective, remain more labor intensive than desirable, however, and result in pole products that are more difficult to safely ship and handle, especially because of the resultant sharp edges that can cause serious injury in storage and shipping.

Consequently, because of the higher costs often associated with other mounting systems, and the labor expenses and safety issues encountered with certain other approaches, as well as the convenience and simplicity of pole mounting systems, most users continue to utilize standard mounting poles and to accept the inconvenience and expense associated with possible recurring misalignments resulting from pole rotations as undesirable conveniences that need to be tolerated.

Consequently, there has remained a need and desire for an inexpensive, improved antennae and dish mounting system that obviates the necessity for service resulting from non-alignment of such antennae or dishes due to spin or rotation of poles upon which they are mounted.

SUMMARY OF THE INVENTION

The present invention, which has now been developed to address such need, is an anti-spin mounting pole for a mounting system for use in a communications system, and a method of forming such anti-spin mounting pole, wherein the pole is intended to hold antennae, dishes, transmitters, and similar devices mounted thereon, hereinafter often referred to generically as communications devices, and to maintain such mounted devices generally stable relative to a given desired position. The mounting pole, once formed, is designed and intended to be readily positionable in a generally vertical position with the lower end portion thereof installed and anchored in a concrete or like base and the upper end extending upwardly to receive the devices to be mounted thereupon.

The anti-spin mounting pole comprises an elongated pole construction that has opposed upper and lower ends and associated end portions along which one or more anti-spin portions are formed. Such pole, in its initial condition before the formation of any anti-spin formations, preferably has a generally uniform cross-sectional configuration throughout its length and, desirably, is generally cylindrical with a generally uniform outer diameter. More specifically, it is preferred that the elongated pole take the form of a cylindrical tube having spaced outer and inner walls, a central opening or channel interior of the inner wall, and a generally uniform wall thickness. Such preferred characteristics are not all necessary for the practice of the subject invention, however, and mounting poles according to the subject invention need only comply with the requirements for the invention as specified hereinafter.

Preferably, the initial elongated pole will thereafter be compressed, such as by a forging, including a swaging, tool or process, at least one localized area along the lower portion of the pole, near the lower end of the pole. Such lower end portion is intended to be installed within a concrete or like base and is hereinafter generally referred to as the base portion of the pole.

The compressive forces applied to compress the pole at the localized area effect an anti-spin portion having an enhanced out-of-round condition along a portion of the elongated pole, with a stretch of the elongated pole, including at least a portion along the upper end of the pole, generally remaining in its initial uncompressed condition and suitable for the mounting of one or more communications devices thereon. The location of such enhanced out-of-round anti-spin portion along the base portion of the mounting pole will serve, once the resultant mounting pole is positioned upright at a base area and a concrete or like base is installed about the base end portion of the resulting pole to prevent or minimize rotation of the pole.

The initial elongated tube will preferably be so compressed at the localized area to effect at least some flattening of the pole construction thereat such that a compressed area having generally flattened front and back sides, and a cross-sectional configuration in or similar to the general form of a flattened oval, is formed along the elongated pole. Dependent upon the positioning of the compressed area along the elongated pole, enhanced out-of-round transition areas will also be formed extending from the compressed area towards adjacent remaining unaltered portions of the elongated pole. The enhanced out-of-round portion formed by such compression, including the compressed area and any adjacent transition areas, is considered to constitute an anti-spin portion along the elongated pole.

As the initial elongated tube is so compressed, the pole will become deformed at the localized compression area to alter the cross-sectional configuration of the pole thereat, effecting at such compressed area a generally flattened cross-section so that the resultant pole, when viewed on end, will appear to have generally oppositely directed ears or lugs projecting outwardly beyond the normal outer perimeter of the initial pole. The formation of such enhanced out-of-round condition and the projecting ears associated therewith enhance the resistance of the resultant pole to rotational forces when the pole is subsequently installed and anchored in a base area.

Preferably, the compressive force applied at the localized area will be sufficient so that, for an initially cylindrically tubular pole, the pole will be so flattened in the compressed area that the front and back sides of the tube become spaced from and generally parallel to one another and so that the initial circular cross-section of the pole is deformed to take the shape of a resulting generally flattened oval, the longer major axis of which defines the resultant width of such compressed area and the shorter minor axis of which defines the resultant depth of such compressed area. Preferably, sufficient compression will be applied so that the initial tube is substantially collapsed at the compressed area such that the resulting larger major axis of the generally flattened oval extends generally parallel to and between the generally flattened front and back sides of the compressed area and the resulting shorter minor axis extends generally transverse to the major axis.

After formation of such an anti-spin portion, the resultant mounting pole will thus include at least a base portion having an anti-spin portion formed therealong wherein the tubular construction has been compressed thereat so that the outer dimension therealong is enhanced out-of-round, with a width greater than the outer diameter dimension of the initial tubular construction and a depth less than outer diameter dimension of the initial tubular construction at the area of compression.

As noted, it is preferred that, in effecting such compression, the applied compressive force be sufficient to at least partially collapse the cylindrical tube at the compression area. Preferably, then, the compression will be sufficient to cause the inner wall surface at the front side of the compressed area to generally abut the inner wall surface at the back side of the compressed area and to effect the general closure of the central opening of the tubular construction thereat, causing the resultant compressed area to assume the general shape of a blade. While total closure of the central opening is not mandatory, and actual contact between the inner wall surface at the front side of the compressed and the inner wall surface at the back side of the compressed area is therefore, not required for the practice of the invention, for purposes and consistency and strength and for maximization of the anti-spin characteristic, such abutment and closure is nevertheless considered desirable. When the compression applied is sufficient to cause the compressed area to assume the general shape of a blade, the resulting mounting pole, when viewed on end, will then appear to have oppositely directed spade-like projections extending beyond the generally uniform outer perimeter of the tubular pole as ears at such compressed area.

In accordance with the preferred embodiment of the invention, for a generally cylindrical tubular pole having a nominal wall thickness t and a perimeter with a nominal outer circumference C, the compression applied will preferably be such that the resulting perimeter measurement of the compressed area will remain essentially equal to C, where the perimeter C of the resulting compressed area is equal to twice the width plus twice the depth of such compressed area, i.e., $C=2w_{AS1}+2d_{AS1}$. With the tube essentially fully collapsed at the compressed area, it is thus preferred that the compressed area along the lower end portion of the mounting pole will therefore have a depth of approximately 2t, or twice the wall thickness t, at the point of maximum compression, and a width approaching $(C-4t)/2$. Such a configuration when installed in a concrete base will tend to even better lock the mounting pole in place against spin or rotation than a lesser compression.

Since, for a cylindrically tubular pole, the initial perimeter measurement C equals $\pi D_O$, where $D_O$ is the nominal outer diameter, the compressed area formed along the lower end portion of the mounting pole will therefore preferably have a depth $d_{AS1}$ of approximately 2t at the point of maximum compression and a width $w_{AS1}$ approaching $(\pi D_O - 4t)/2$. Such width is greater than the width $(D_O)$ of the initial tube and remaining unaltered stretches thereof, with the increase in width attributable to the pair of oppositely directed ears being approximately equal to $$<= w_{AS1} - D_O$$
$$= ((\pi D_O - 4t)/2) - D_O$$
$$= (\pi D_O - 4t - 2D_O)/2$$
$$= (\pi D_O - 2D_O - 4t)/2$$
$$= ((\pi - 2)DO/2) - 4t/2$$
$$= ((\pi - 2)DO/2) - 2t.$$

Consequently, each of the spade-like ears will project a distance $d_P$ approximately half of <, or a distance approaching $d_P=((\pi-2) DO/4)-t$, i.e., approximately $0.285D_O-t$, beyond the nominal outer perimeter of the initial cylindrical tube and remaining unaltered stretches thereof.

Another preferred embodiment also includes a second compressed area similarly formed at a spaced interval along the tubular construction from the first compressed area to form a second anti-spin portion along the lower end of the tubular pole, preferably with the blade of the second compressed area being rotationally offset from the blade of the first compressed area. In one of such preferred embodiments, the offset is approximately 90°.

The use of multiple anti-spin portions can, at least up to a point, result in increased resistance to spin or rotation.

Other preferred embodiments include mounting poles wherein an anti-spin portion is formed at the bottom, or base, of the mounting pole, rather than at a spaced interval above the base, and embodiments resulting from poles whose initial configurations are of various cross-sectional shapes.

For embodiments having multiple anti-spin portions, it is considered efficacious to apply the compressive forces for the respective anti-spin portions in a rotationally offset manner. Such forces may be conveniently applied either substantially simultaneously or in a sequential manner. In the event that the forces are applied sequentially, the pole may be advanced, or advanced and rotated, to affect desired spacing and/or rotational offset between the anti-spin portions.

BRIEF DESCRIPTION OF THE DRAWINGS

In referring to the drawings:

FIG. 1 is an isometric view of one preferred embodiment of the anti-spin mounting pole of this invention;

FIG. 2 is a side view of the mounting pole of FIG. 1, the opposite side view being a mirror image thereof;

FIG. 3 is a front view of the mounting pole of FIG. 1;

FIG. 4 is a back view of the mounting pole of FIG. 1;

FIG. 5 is a top view of the mounting pole of FIG. 1; and

FIG. 6 is a bottom view of the mounting pole of FIG. 1;

DESCRIPTION OF THE PREFERRED EMBODIMENT

Figure 7:
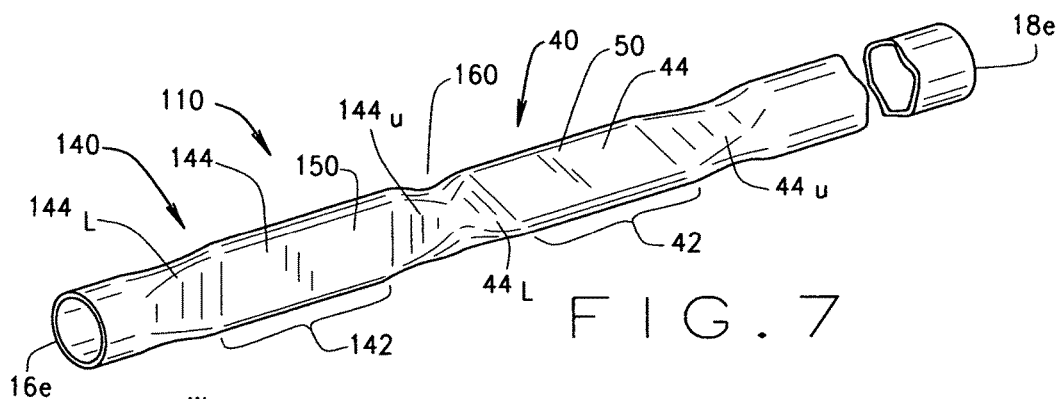
FIG. 7 is an isometric view of another embodiment of an anti-spin mounting pole according to this invention, which pole includes a pair of spaced anti-spin portions along the lower end portion of pole, the compressed areas of which anti-spin portions are rotationally offset from one another by approximately 90°.
Figure 8:
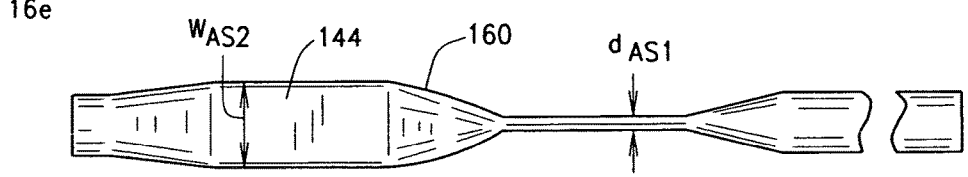
FIG. 8 is a side view of the mounting pole of FIG. 7, the opposite side view being a mirror image thereof.
Figure 9:
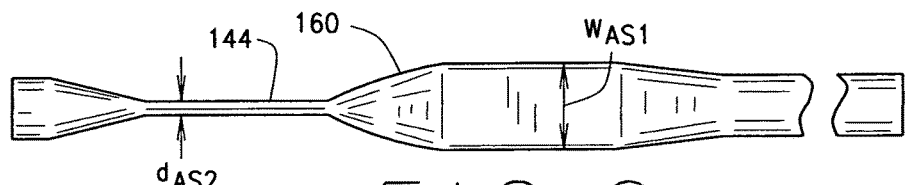
FIG. 9 is a front view of the mounting pole of FIG. 7.
Figure 10:
FIG. 10 is a back view of the mounting pole of FIG. 7.

With reference now to the drawings, where like numerals refer to generally like items, FIGS. 1-6 depict a preferred embodiment 10 of an anti-spin mounting pole 12 that had been formed from an elongated pole 14 that has opposed lower and upper end portions 16 and 18 with associated, respective, lower, or base, and upper outer ends 16e and 18e. In the embodiment 10, the resultant elongated pole 12 has been formed from an initial pole 14 that was of a generally cylindrically tubular configuration 20, as evident at cut 22 and at base end 16e, with spaced outer and inner wall surfaces 24 and 26, respectively, and a central opening 28 interior of said inner wall surface 26. Such initial tube 20, as is typical, initially had throughout its length a generally circular outer perimeter with a circumference C, a generally uniform outer diameter $D_O$, a generally uniform cross-sectional configuration, and a generally uniform wall thickness t, as is observable at base end 16e.

After formation of the resultant pole 12, such pole includes not only unaltered stretches of tubing, such as near the opposite ends 16e and 18e of the pole, but also, importantly, an anti-spin portion 40 formed along the lower end portion 16 of such pole. At such anti-spin portion 40, the initial tubular construction 20 has been compressed, as at centered area 42, to form a first compressed area 44, with adjacent lower and upper transition areas $44_L$ and $44_U$, so that the outer dimension of the resultant pole 12 along the anti-spin portion 40 is enhanced out-of-round, especially relative to the initial elongated pole 14 and the remaining unaltered stretches of resultant pole 12.

As the initial tubular construction 20 of the preferred embodiment 10 of FIGS. 1-6 is compressed, such as by a forging, including a swaging, tool or process, applied at such centered area 42 along the lower end portion 16 of the initial pole 14, the tubular construction 20 at the centered area 42 along the anti-spin portion 40 is generally flattened thereby forming first anti-spin portion 40. As greater compression occurs, initial pole 14 is increasingly deformed at centered area 42 to form first compressed area 44, with the front and back sides 46 and 48 of such compressed area 44 being increasingly flattened thereat and with the generally circular cross-section of the pole 12 thereat instead taking the general shape of an increasingly flattened oval.

In general, such a flattened oval has a longer major axis extending generally from side-to-side between the generally flattened front and back sides 46 and 48 to define the resultant width $w_{AS1}$ of the first compressed area 44 and a shorter minor axis extending generally transverse to such major axis to define the resultant depth $d_{AS1}$ of the first compressed area 44. As best seen in FIG. 2, it is preferred, though not required, that the compression applied be sufficient such that, especially in the resulting first compressed area 44, the front and back sides 46 and 48 are flattened so as to be generally spaced from and parallel to one another, with the longer major axis of the flattened oval thus extending generally parallel to and between the generally flattened front and back sides 46 and 48 of compressed area 44.

When the initial tubular construction 20 is so compressed to form an anti-spin portion 40 as shown in FIGS. 1-6, the inner wall surfaces at the front and back sides 46 and 48 of the anti-spin portion 40 are thus moved closer to one another, preferably to abut or almost abut one another, so as to effect a narrowing or closure of the central opening 28 of the tubular construction thereat and to effect an enhanced out-of-round condition thereat, although, as discussed previously hereinabove, total closure of the central opening 28 is not mandatory and actual contact between the inner wall surface at the front side of the anti-spin portion and the inner wall surface at the back side of the anti-spin portion is therefore not required.

As depicted in the preferred embodiment 10, however, when starting with an initial tubular pole 20 having a nominal outer diameter $D_O$ and a nominal wall thickness t, such pole is thus preferably compressed to essentially close the central opening 28 at the first compressed area 44 of the anti-spin portion 40 such that the resultant mounting pole 12 has a width $w_{AS1}$ of approximately $(\pi D_O - 4t)/2$ at the first compressed area 44 and a depth $d_{AS1}$ of approximately 2t thereat, with a decreasingly less out-of-round condition extending to the opposite sides of first compressed area 44 for some distance, including through the transition areas $44_L$ and $44_U$.

Because of the enhanced out-of-round condition of the resultant pole 12 at the first compressed area 44 and in the transition areas $44_L$ and $44_U$ to the sides of first compressed area 44, including the significant differential between the width $w_{AS1}$ and depth $d_{AS1}$ associated with the compressed area 44 of first anti-spin portion 40, as opposed to the essential outer diameter $D_O$ uniformity of the initial tubular pole 20 and remaining unaltered stretches of resultant pole 12, installation of the anti-spin portion 40 within a concrete base will then tend to lock the mounting pole 12 in place against spin or rotation in the pole mount channel formed in the concrete base as the concrete solidifies about the pole 12.

The significance of the width $w_{AS1}$ relative to the outer diameter $D_O$ of the initial pole is evident in FIGS. 5 and 6 in which it can be seen how the compression of the initial pole 14 results in the compression area 44 having a width $w_{AS1}$ that is greater than the outer diameter $D_O$ of such pole and such that oppositely directed ears 52 and 54 are formed along the pole 12. Such ears 52 and 54 help lock the resultant pole 12 in position in the concrete base when the lower end portion 16 of the pole is positioned in a base hole and the hole is then filled with concrete. Such ears greatly improve the ability of such an installed pole to resist spin forces that may then act upon the pole and any communications device installed on the upper portion thereof.

For commonly employed 16 gauge tubular poles having nominal 1.660 inch outer diameters and nominal wall thicknesses of 0.065 inches, it is thus preferred that the pole be compressed to effect a resulting depth $d_{AS1}$ of the first anti-spin portion 40 approaching $d_{AS1}=2t=0.130$ inches with the resulting width $w_{AS1}$ of the anti-spin portion 40 approaching $wAS1=((\pi D_O-4t)/2=2.4775$ inches, and with each of the spade-like ears 52 and 54 projecting a distance approaching $dP=((\pi D_O/4)-t=/4088$ inches beyond the outer perimeter of such pole.

While such a degree of compression is preferable, it has been found that considerably less compression can still affect anti-spin portions that are sufficiently out-of-round to adequately inhibit rotation or spin of the resultant pole. In such regard, by way of example only and not by way of limitation, compression of the pole to effect an anti-spin portion therealong having a depth $d_{AS1}$ of approximately 0.996 inches and a width $w_{AS1}$ of approximately 1.920 inches, with each of the ears projecting 0.13 inches beyond the outer perimeter of the pole, acts to inhibit undesired rotation of the resultant pole when it has been erected installed with the anti-spin portion thereof within a concrete base.

In general, the height of the formed anti-spin portion is not considered to be particularly significant, although the central compression area must necessarily be of sufficient dimension to affect the desired enhanced out-of-round condition for the anti-spin portion. Typically, in practice, the height will be determined by the actual compression or swaging tool or procedure utilized to effect the compression and may include both the height $h_{CC}$ of a central compression area as well as the heights $h_T$ and $h_B$ of adjacent out-of-round transition portions.

For the preferred embodiment 10 utilizing a 16 gauge tube having a nominal 1.660 inch outer diameter, it has been found convenient to compress the tube so that the height $h_{CC}$ of the central compression portion is approximately 4.5 inches and so that the overall height $h_O=h_T+h_B$ of the anti-spin portion 40 is approximately 10.5 inches, with generally equal amounts $h_T$ and $h_B$ to the top and bottom of the central compression area, as best seen in FIG. 3. As will be appreciated, for lesser compression, the heights $h_T$ and $h_B$ may decrease.

Figure 11:
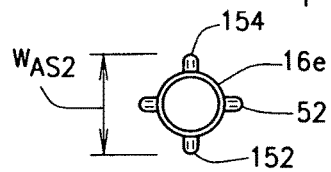
FIG. 11 is a top view of the mounting pole of FIG. 7.
Figure 12:
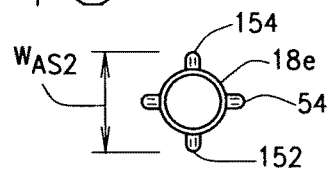
FIG. 12 is a bottom view of the mounting pole of FIG. 7.
Figure 13:
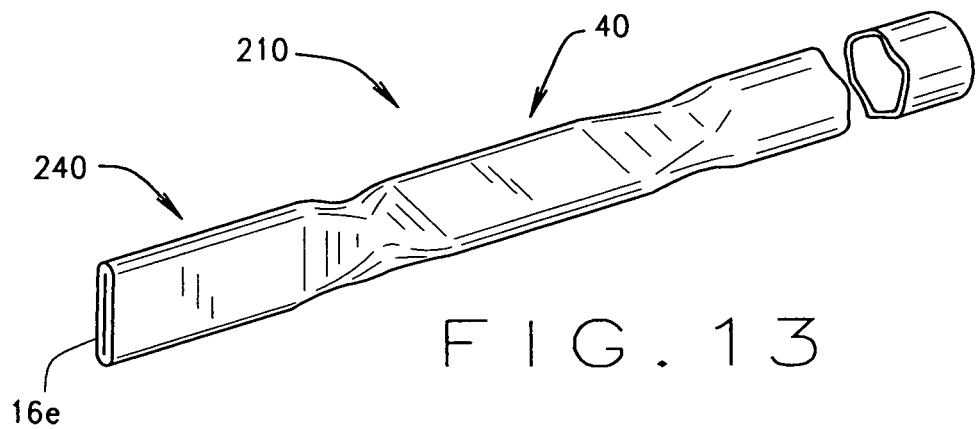
FIG. 13 is an isometric view of another embodiment of an anti-spin mounting pole according to the invention, similar in many respects to the embodiment of FIG. 7, but wherein one anti-spin portion is formed at the outer end of the mounting pole.
Figure 14:
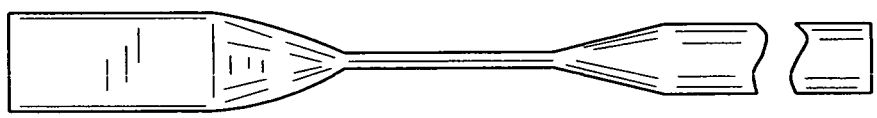
FIG. 14 is a side view of the mounting pole of FIG. 13, the opposite side view being a mirror image thereof.
Figure 15:
FIG. 15 is a front view of the mounting pole of FIG. 13.
Figure 16:
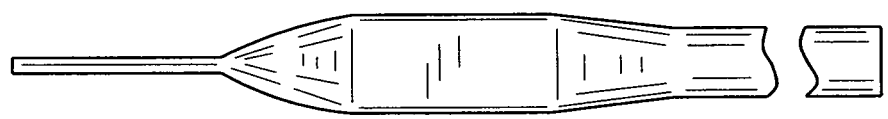
FIG. 16 is a back view of the mounting pole of FIG. 13.
Figure 17:
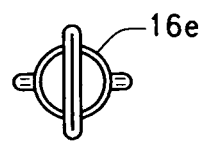
FIG. 17 is a bottom view of the mounting pole of FIG. 13.
Figure 18:
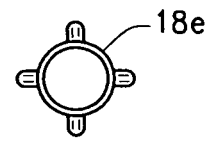
FIG. 18 is a top view of the mounting pole of FIG. 13.
Figure 19:
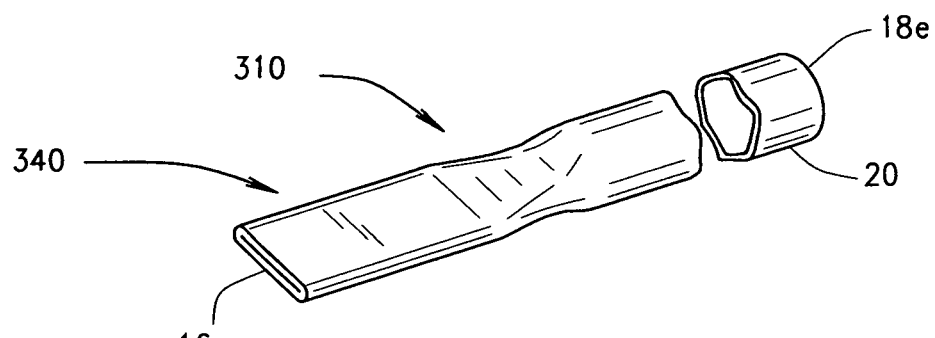
FIG. 19 is an isometric view of still another embodiment of an anti-spin mounting pole according to the invention, similar in a number of respects to the embodiment of FIG. 1, but wherein the anti-spin portion is formed at the outer end of the mounting pole.
Figure 20:
FIG. 20 is a side view of the mounting pole of FIG. 19, the opposite side view being a mirror image thereof.
Figure 21:
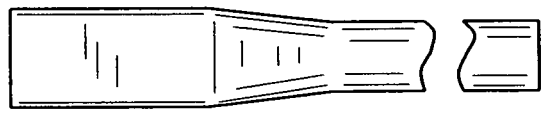
FIG. 21 is a front view of the mounting pole of FIG. 19.
Figure 22:
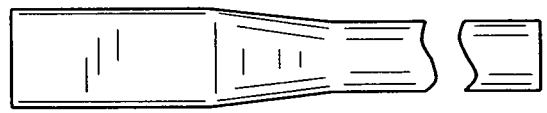
FIG. 22 is a back view of the mounting pole of FIG. 19.
Figure 23:
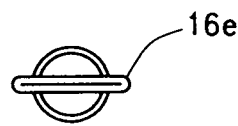
FIG. 23 is a bottom view of the mounting pole of FIG. 19.
Figure 24:
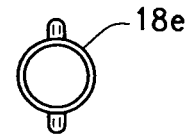
FIG. 24 is a top view of the mounting pole of FIG. 19.
Figure 25:
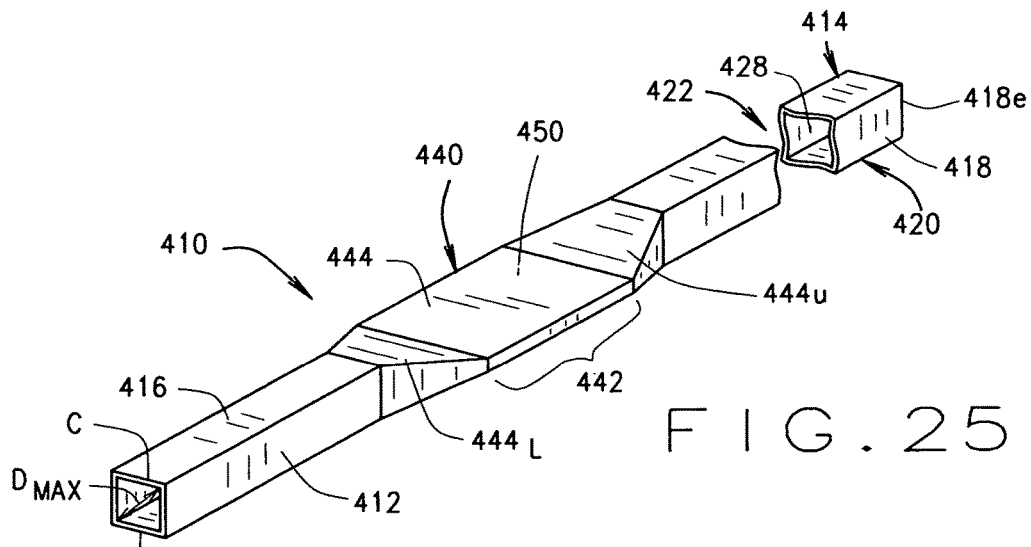
FIG. 25 is an isometric view of still another embodiment of an anti-spin mounting pole according to the invention, similar in a number of respects to the embodiment of FIG. 1, but wherein the initial pole is a tubular pole having a generally square cross-sectional configuration.
Figure 26:
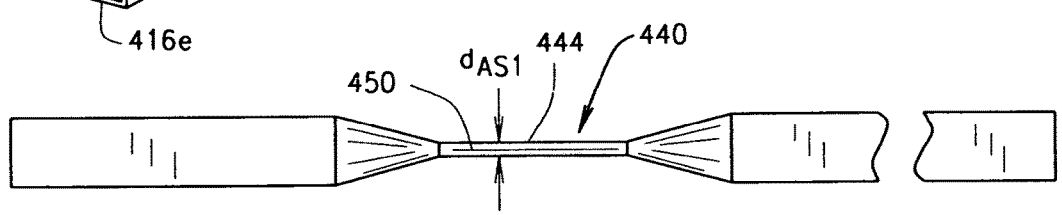
FIG. 26 is a side view of the mounting pole of FIG. 25, the opposite side view being a mirror image thereof.
Figure 27:
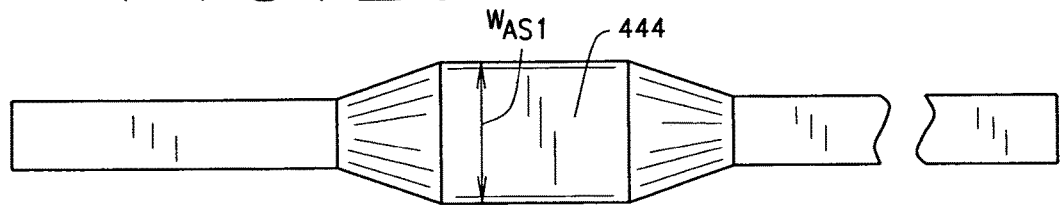
FIG. 27 is a front view of the mounting pole of FIG. 25.
Figure 28:
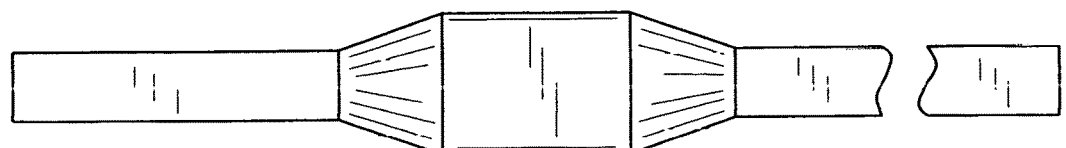
FIG. 28 is a back view of the mounting pole of FIG. 25.

FIGS. 7-12 depict another preferred embodiment 110, similar in many respects to the embodiment 10 of FIGS. 1-6, but which embodiment 110 also includes a second anti-spin portion 140, similar in many respects to the first anti-spin portion 40 and generally similarly formed, but spaced from first anti-spin portion 40. Second anti-spin portion 140 is so formed to have a compression area 144 at a spaced interval along the resultant pole 12 from the compression area 44 of first anti-spin portion 40. In the embodiment 110, second anti-spin portion 140 has a blade 150 configuration formed at the second compressed area 144, which blade 150 is rotationally offset by approximately 90° from the blade 50 configuration formed at the first compressed area 44. Such second anti-spin portion 140, with its oppositely directed ears 152 and 154, as shown in FIGS. 11 and 12, when also installed within a concrete base, further serves to lock the embodiment 110 in place against spin or rotation.

As should be appreciated, depending upon the spacing between the central compression areas for the two anti-spin portions 40 and 140, the transition areas adjacent to and intermediate the first and second compressed areas may intersect with one another rather than merging with stretches of the initial pole that remain unaltered and/or in-round. Such is the case with respect to embodiment 110, in which transition area $44_L$ intersects with transition area $144_U$ at 160, as a consequence of which the heights associated with the transition portions $44_L$ and $144_U$ may be foreshortened, thereby also affecting the overall heights of the anti-spin portions 40 and 140.

FIGS. 13-18 depict yet another preferred embodiment 210, highly similar to the embodiment 110, but wherein a second anti-spin portion 240 is formed to include or be at the base end 16e of the resultant pole 12 rather than being spaced a short distance above the base end 16e of the pole 12, as was the situation in embodiment 110.

FIGS. 19-25 depict still another preferred embodiment 310, similar in certain respects to both of the embodiments 110 and 210, but having only one anti-spin portion 340 formed at the base end $16_e$ of the tubular pole 20 of the embodiment 310 rather than being spaced a short distance from the base end 16e of the tubular pole 20, as in embodiment 10.

It will be appreciated that, while all of FIGS. 1-24 depict embodiments in which the resultant anti-spin pole is formed from a pole that was initially a generally cylindrical tube, the practice of this invention is not limited to use with or on cylindrical tubes or even tubular poles. In such regard, by way of example, and not by way of limitation, FIGS. 25-30 depict still another embodiment 410 of an anti-spin mounting pole 412 that has been formed from an elongated pole 414 of a generally square tubular configuration.

In such embodiment 410, the resultant pole 412 has been formed from an initial elongated pole 414 that has opposed lower and upper end portions 416 and 418 with associated, respective, lower, or base, and upper ends 416e and 418e. The initial elongated pole 414 has the form of a tubular pole 420 with a generally square cross-section, as evident at cut 422 and base end 416e, preferably with a generally uniform wall thickness and a central opening 428 interior of the inner wall surfaces. After formation of the resultant pole 412, such pole includes unaltered stretches of tubing retaining a square cross-section, such as near the opposite ends 416e and 418e of the pole, as well as a anti-spin portion 440 formed along the lower end portion 416 of resultant pole 412, whereat the tube has been forcibly collapsed to form such anti-spin portion 440.

Figure 29:
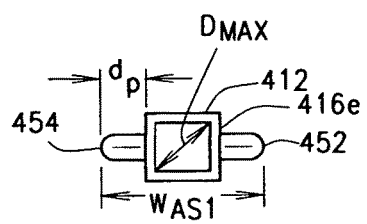
FIG. 29 is a bottom view of the mounting pole of FIG. 25.
Figure 30:
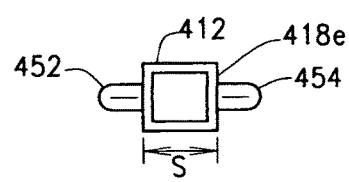
FIG. 30 is a top view of the mounting pole of FIG. 25.

As is readily observable from FIGS. 25-30, the tubular construction 420 has been so compressed at centered area 442 along resultant pole 412 to form a first compressed area 444, with adjacent lower and upper transition areas $444_L$ and $444_U$ extending to the sides of compressed area 44. As compression occurs, oppositely directed blade-like ears 452 and 454 that project beyond the outer perimeter of the remaining unaltered stretches of the tubular construction 420, as best seen in FIGS. 29 and 30, are also formed. The compression that effects such compressed area 444 and such ears 452 and 454 thus effects an enhanced out-of-round area along the tubular construction 420 that, when installably locked in position in a concrete base, is more resistant to spin or rotation than the initial generally square tubular pole.

As increasingly greater compression occurs, the initial tubular pole 420 is collapsed at the compression area such that the depth $d_{AS1}$ of the compressed area 444 approaches 2t, where t is the thickness of the tubular wall, and the width $w_{AS1}$ of the compressed area 444 approaches (C−4t)/2, where C is the circumference of the perimeter of the initial tubular pole 420. Since, for a square tube, C=4S, where S is the length of a side of the tube, the width $w_{AS1}$ thus approaches 2(S−t), with each of the ears 452 and 454 thus projecting approximately (S−2t)/2 beyond the side of the unaltered stretch of the initial pole 414, as seen in FIGS. 29 and 30.

As will be appreciated, poles of non-circular cross-section, such as square tubes, because of their inherent out-of-round character, possess some native resistance to rotation or spin when they are installed to be locked in a concrete base. For square tubes, the minimal dimension is approximately the length S of a side of the tube while the maximal dimension $D_{max}$, from corner to corner of the tube, is approximately S*⊕2, and the difference between such dimensions helps afford resistance to rotation. For resultant anti-spin mounting poles formed from square tubes, the resistance to rotation is further enhanced, however, by the creation of the greater discrepancies between minimal and maximal dimensions of the resultant pole, such as between the width $w_{AS1}$ and the depth $d_{AS1}$, associated with the compressed area 444, along the pole 412.

It is also preferred that the enhanced out-of-round portion be so compressed that the width $w_{AS1}$ thereof be greater than the maximal dimension $D_{max}$ of unaltered stretches of the such pole to further increase resistance to rotation. Consequently, for a square tube, it is preferred that the width $w_{AS1}$ of the compressed area be greater than S*⊕2.

Generally, regardless of the particular cross-sectional shape of the pole, the resistance to rotation can be similarly enhanced by creating greater discrepancies between minimal dimensions and maximal dimensions, such as between the width $w_{AS1}$ and the depth $d_{AS1}$ at compressed areas in the embodiments of the invention, and between the width $w_{AS1}$ and the maximal dimension of unaltered stretches of the initial pole. For poles that initially have generally circular cross-sections, such as cylindrical tubes, the maximal dimension will generally be the nominal outer diameter whereas, for poles that initially have generally polygonal cross-sections, such as square tubes or poles with star or other shaped cross-sections, the maximal dimension will often be a distance across the pole between two of the outermost points about the cross-sectional perimeter of the pole.

Preferred minimal compression settings for poles of differing cross-sectional configurations may typically be based upon the amount of force that must be applied at the compression area to effect at such area a desired width $w_{AS1}$ that is greater than the maximal cross-sectional dimension of the initial pole from which the anti-spin mounting pole is to be formed. Generally, the greater the resultant width $w_{AS1}$ of the compressed area, the less the resultant depth $d_{AS1}$ of such compressed area.

In light of all the foregoing, it should thus be apparent to those skilled in the art that there has been shown and described an anti-spin mounting pole and a method of forming such a mounting pole. However, it should also be apparent that, within the principles and scope of the invention, many changes are possible and contemplated, including in the details, materials, and arrangements of elements which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

We claim:

1. An anti-spin mounting pole for a mounting system for usage in a communications system wherein the mounting pole is intended to hold a communications device mounted thereon and to maintain the communications device generally stable relative to a given required position, said anti-spin mounting pole comprising:

a single piece elongated pole having opposed upper and lower ends and associated upper and lower end portions and a generally uniform cross-sectional configuration defining a nominal outer perimeter with a central opening for said elongated pole, the lower end having a circular outer perimeter having a circumference and a uniform outer diameter;

a first compressed area thereafter formed in said elongated pole above said lower and thereof, said first compressed area including an enhanced out-of-round section formed on a portion of said lower end portion of said elongated pole defining a first anti-spin portion, the first compressed area having a lower transition area, and an upper transition area between the first compressed area and the upper end portion;

said enhanced out-of-round section of said first anti-spin portion forming in at least said first compressed area a first pair of generally oppositely projected ears extending outwardly beyond said nominal outer perimeter of said elongated pole, said elongated pole with said first anti-spin portion formed thereon being positionable in a generally vertical position with the lower end portion thereof, with the upper end portion of said mounting pole extending upwardly to receive the communications device to be mounted thereupon;

said first anti-spin portion thereof in a stable position resistant to rotation of said mounting pole with said first pair of oppositely projected ears;

said elongated pole includes one or more portions, defined as nominal pole portions, that generally retain the initial configuration of the elongated pole;

a first nominal pole portion of the nominal pole portions being located above said first anti-spin portion;

said first anti-spin portion includes said first compressed area and said lower transition area adjacent said first compressed area, said lower transition area being enhanced out-of-round and extending between said first compressed area and said first nominal pole portion;

said generally uniformed cross-sectional configuration of said elongated pole has as a generally maximal cross-sectional dimension;

said enhanced out-of-round section of said first anti-spin portion in at least said first compressed area having a width $w_{AS1}$ greater than said generally maximal cross-sectional dimension;

said single piece elongated pole is initially generally an elongated tube, said tube having inner and outer walls spaced from one another, a central opening, and a generally uniform wall thickness;

said enhanced out-of-round section of said first anti-spin portion comprises in at least said first compressed area a depth $d_{AS1}$ approximating 2t and the width $w_{AS1}$ approximating (C−4t)/2 where C is the initial generally uniform outer circumference of the perimeter of the elongated tube and t is the initial generally uniform wall thickness of the elongated tube;

a second compressed area thereafter formed in said elongated pole below the first compressed area, said second compressed area comprising a second enhanced out-of-round section along a portion of said elongated pole defining a second anti-spin portion, the second compressed area having a lower transition area and an upper transition area; and said second enhanced out-of-round section of said second anti-spin portion forming in at least said second compressed area a second pair of generally oppositely projected ears extending outwardly beyond said nominal outer perimeter of said elongated pole, with said second pair of oppositely projected ears of said second anti-spin portion having a rotational offset relative to said first pair of oppositely projected ears of said first anti-spin portion.

2. The anti-spin mounting pole of claim 1 wherein, at said first compressed area, said elongated pole is compressed to form frontside and backside portions thereat, with said inner wall of said frontside portion generally abutting said inner wall of said backside portion, and to substantially close said central opening in said elongated tube.

3. The anti-spin mounting pole of claim 1 wherein: said single piece elongated pole is generally cylindrical with a generally uniform nominal outer diameter, said first compressed area is formed near said lower end above said second compressed area, and said enhanced out-of-round section of said first anti-spin portion forming in at least said first compressed area, a depth $d_{AS1}$ less than said nominal initial outer diameter of said pole, and a cross-sectional configuration generally approximating a flattened oval.

4. The anti-spin mounting pole of claim 3 wherein: said elongated pole includes one or more portions, defined as in-round portions, that generally retain the initial configuration of the elongated pole, a first in-round portion being located above said first anti-spin portion, and said first anti-spin portion includes said first compressed area and said upper transition area adjacent said first compressed area, said upper transition area being out-of-round and extending between said first compressed area and said first in-round portion.

5. The anti-spin mounting pole of claim 4 wherein said upper transition area has a width that generally decreases from the width at the first compressed area to the generally uniform outer diameter of the first in-round portion and a depth that generally increases from the depth at the first compressed area to the generally uniform outer diameter of the first in-round portion.

6. The anti-spin mounting pole of claim 3 wherein, at said first compressed area, said elongated pole is compressed to form frontside and backside portions thereat, with said inner wall of said frontside portion generally abutting said inner wall of said backside portion, and to substantially close said central opening in said elongated tube.

7. The anti-spin mounting pole of claim 6 wherein said width $w_{AS1}$ approximates $(\pi D_O-4t)/2$ and said depth $d_{AS1}$ approximates 2t, where $D_O$ is the initial generally uniform outer diameter of the elongated tube and t is the initial generally uniform wall thickness of the elongated tube.

8. The anti-spin mounting pole of claim 7 wherein said first compressed area is compressed to generally have the first pair of generally oppositely protected ears through the closure of the central opening of the elongated tube.

9. The anti-spin mounting pole of claim 3 wherein said second compressed area is compressed to generally have the second pair of generally oppositely projected ears through the closure of the central opening of the elongated tube.

10. The anti-spin mounting pole of claim 9 wherein: at said first and second compressed areas, said elongated pole is compressed to form frontside and backside portions thereat such that the major axes of the flattened oval configurations of said first and second compressed areas generally extend from side-to-side between said frontside and backside to define said width $w_{AS1}$ and a width $w_{AS2}$ of said respective first and second compressed areas, and said first and second compressed areas are compressed so that the major axes of the flattened oval configurations of said first and second compressed areas are disposed at a rotational offset from one another.

11. The anti-spin mounting pole of claim 10 wherein said rotational offset is approximately 90 degree.

12. The anti-spin mounting pole of claim 9 wherein said second compressed area is immediately adjacent said lower end of said mounting pole.

13. The anti-spin mounting pole of claim 1 wherein said enhanced out-of-round condition of said second compressed anti-spin portion comprises in at least said second compressed area a depth $d_As2$ approximating 2t and a width $w_As2$ approximating (C−4t)/2 where C is the initial generally uniform outer circumference of the perimeter of the elongated tube and t is the initial generally uniform wall thickness of the elongated tube.

14. The anti-spin mounting pole of claim 13 wherein: said rotational offset is 90°.

15. The anti-spin mounting pole of claim 14 wherein said lower transition area of the second compressed area has a width that generally decreases from the width at the second compressed area to the generally uniform outer diameter of the elongated pole and a depth that generally increases from the depth at the second compressed area to the generally uniform outer diameter of the elongated pole.

16. The anti-spin mounting pole of claim 15 wherein said upper transition area of the first compressed area has a height and said lower transition area of the first compressed area has a height and the heights of said upper and lower transition areas on said mounting pole are essentially equal to one another.

17. The anti-spin mounting pole of claim 1 wherein said first and second compressed areas are compressed to generally have said respective first and second pair of generally oppositely projected ears through the closure of the central opening of the elongated tube.

18. The anti-spin mounting pole of claim 17 wherein said said first and second pair of generally oppositely projected ears are rotationally offset from one another by 90 degrees.

19. The anti-spin mounting pole of claim 1 wherein, at said second compressed area, said elongated pole is compressed to form frontside and backside portions thereat, with said inner wall of said frontside portion generally abutting said inner wall of said backside portion, and to substantially close said central opening in said elongated tube.

\* \* \* \* \*